United States Patent [19]
Richman

[11] 3,962,647
[45] June 8, 1976

[54] BIPHASE WAVEFORM GENERATOR USING SHIFT REGISTERS

[75] Inventor: Jay L. Richman, Montville, N.J.

[73] Assignee: The Bendix Corporation, Teterboro, N.J.

[22] Filed: Sept. 27, 1974

[21] Appl. No.: 509,766

[52] U.S. Cl. ................................. 328/59; 328/35; 328/37; 328/63; 307/262; 307/215; 307/269
[51] Int. Cl.² ........................................ H04B 1/00
[58] Field of Search ............... 307/221 R, 227, 215, 307/262, 209; 328/59, 35, 63, 37; 235/61

[56] References Cited
UNITED STATES PATENTS

| | | | |
|---|---|---|---|
| 3,628,100 | 12/1971 | Zettler | 307/221 |
| 3,675,049 | 7/1972 | Haven | 307/221 R |
| 3,745,535 | 7/1973 | DeKoe et al. | 307/221 X |

Primary Examiner—Stanley D. Miller, Jr.
Assistant Examiner—B. P. Davis
Attorney, Agent, or Firm—Anthony F. Cuoco; S. H. Hartz

[57] ABSTRACT

A biphase waveform is generated using a serial register of length 2N where N is the number of bits to be transmitted. Each data bit is loaded into a shift register, both directly and through an inverter. Double speed clocking provides an alternating logic level signal for each data bit and the phases of the alternating signals are combined to provide the biphase waveform.

7 Claims, 4 Drawing Figures

BIPHASE WAVEFORM GENERATOR USING SHIFT REGISTERS

BACKGROUND OF THE INVENTION

1. Field of the Invention

This invention relates to apparatus for generating biphase waveforms and particularly to means of the type described employing shift registers. More particularly, this invention relates to a biphase waveform generator using a serially arranged shift register of length 2N where N is the number of bits to be transmitted.

2. Description of the Prior Art

Many of the digital communications systems now in use employ biphase waveforms. The advantage of this type of waveform is its self clocking characteristic. When transmitted as a bi-polar waveform the benefits of differential transmission lines add to its desirability as a form of communication. One of the more widely used biphase waveforms is that known as the Manchester code. The present invention deals with apparatus for generating such a code.

The classical approach to the aforenoted code generation rests on the fact that an "exclusive-or" relationship exists between the biphase waveform and the NRZ binary data i.e., data that does not return to zero. A shift clock is used to create the waveform. Typically, an eight bit shift register is loaded with the binary input information to be transmitted. When the shift clock is active, data is shifted out of the register. The clock and register outputs are "exclusive-or-ed", and the result is enveloped with a "transmit enable" signal which produces the desired biphase waveform or Manchester word. The resulting waveform may be the input to a differential output stage for driving a transformer coupled transmission line. Inverters may be provided before the "exclusive or" gate operation to match the propagation delay of the shift register for providing coincidence of the waveforms. At higher clocking rates, this coincidence or alignment as well as the differences between rise and fall times becomes increasingly more critical.

SUMMARY OF THE INVENTION

The present invention contemplates apparatus for generating a biphase waveform which eliminates the above noted disadvantages of prior art devices. The apparatus is constructed in recognition of the fact that any Manchester or biphase waveform may be constructed piece-wise in a serial register of length 2N where N is the number of bits to be transmitted. When this register is clocked at twice the output data rate, the desired biphase output waveform is obtained. Since no compensation for propagation delay or the difference between rise and fall times is required, the performance of this apparatus is limited only by the speed of the logic devices employed. When certain of the bits are predetermined, inverters may be eliminated by wiring the bits to ground or to a predetermined positive voltage level.

The main object of this invention is to provide a biphase waveform utilizing a serial register of length 2N where N is the number of bits to be transmitted.

Another object of this invention is to provide apparatus of the type described where it is not necessary to accommodate propagation delay or the difference between rise and fall times so that the performance of the apparatus is limited only by the speed of the logic components employed.

Another object of this invention is to provide apparatus of the type described featuring double speed clocking which generates an alternating logic level signal for each data bit, and the phases of said signals are combined to provide the biphase waveform.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
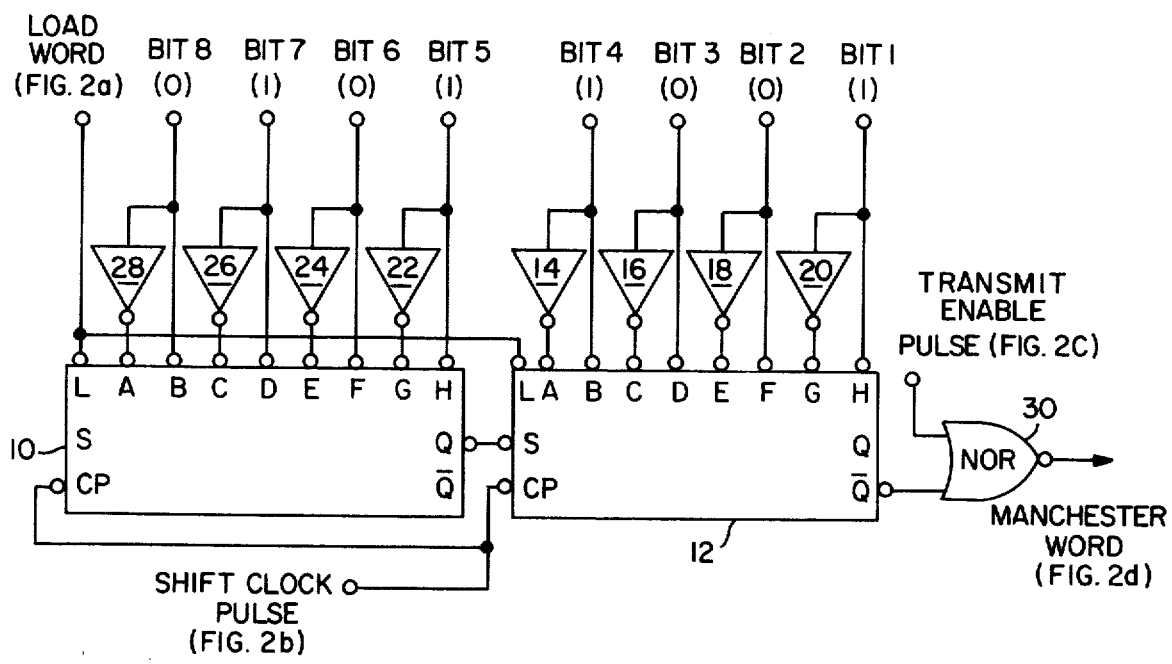
FIG. 1 is a schematic diagram of a biphase waveform generator according to the invention.

The invention as shown in FIG. 1 includes a conventional type shift register 10 and another conventional type shift register 12, both of which may be of the type marketed by the Texas Instrument Co. and carrying the trade designation Ser. No. 54165. Shift registers 10 and 12 each have load terminals L, input terminals S and clock pulse terminals CP. The registers also have terminals A, B, C, D, E, F, G and H, each pair of which terminals receives a bit of an eight bit digital word.

Thus, terminals A, C, E and G of shift register 12 receive bits 4, 3, 2 and 1 of the eight bit digital word and which bits are applied through inverters 14, 16, 18 and 20 respectively. Bits 1, 2, 3, and 4 are applied directly to terminals H, F, D and B of shift register 12. Bits 5, 6, 7 and 8 of the eight bit digital word are applied to terminals G, E, C and A of shift register 12 through inverters 22, 24, 26 and 28 respectively. Bits 5, 6, 7 and 8 are applied directly to terminals H, F, E and B of shift register 12. Inverters 14–28 may be of the conventional type such as marketed by the Texas Instrument Co. and carrying the trade designation Ser. No. 5404.

Figure 2:
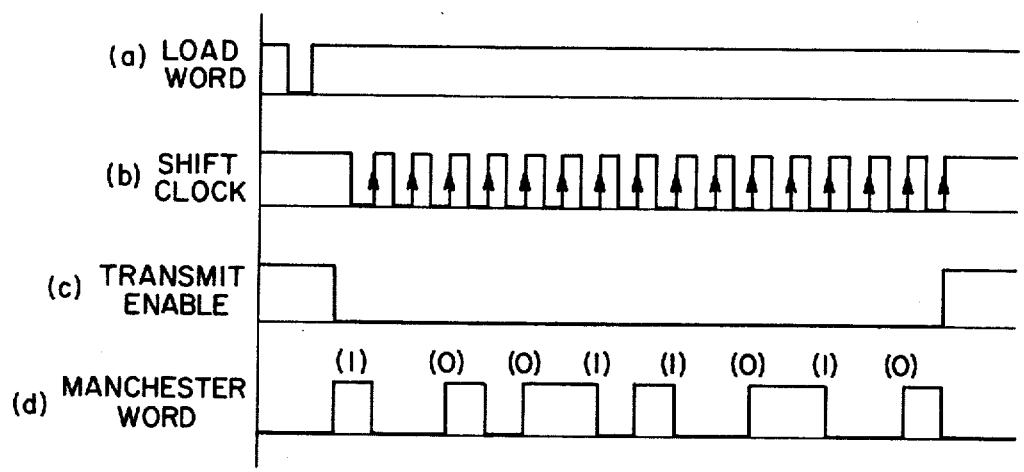
FIGS. 2(a), (b), (c), (d), are waveforms commensurate with the operation of the apparatus as shown in FIG. 1.

A load word having a waveform as shown in FIG. 2(a) is applied to terminals L of shift registers 10 and 12. A shift clock pulse having a waveform as shown in FIG. 2(b) is applied to terminals CP of shift registers 10 and 12.

Shift registers 10 and 12 each have an output terminal Q and a complimentary output terminal $\bar{Q}$. Terminal $\bar{Q}$ of shift register 10 is connected to input terminal S of shift register 12. Terminal $\bar{Q}$ of shift register 12 is connected to one input of a NOR gate 30. The other input of NOR gate 30 receives a "transmit enable" pulse having a waveform as shown in FIG. 2(c). NOR gate 30 provides a biphase output which is a Manchester word having a waveform as shown in FIG. 2(d). NOR gate 30 may be of the conventional type such as manufactured by the Texas Instrument Co. and carrying the trade designation Ser. No. 5402.

As shown in FIG. 1, bits 1, 4, 5 and 7 of the 8 bit binary word are at a logic "one" level and bits 2, 3, 6 and 8 are at a logic "zero" level.

OPERATION OF THE INVENTION

The invention as described recognizes that any Manchester or biphase waveform may be constructed piece-wise in a serial register of length 2N where N is the number of bits to be transmitted. When the register is clocked at twice the output data rate as described and shown, the desired biphase output shown in FIG. 2(d) is obtained. No compensation is required for propagation delays or the difference between rise and fall times and hence the performance of the apparatus described is limited only by the speed of the components employed. To this extent, registers 10 and 12 may be of the emitter coupled type logic devices which operate at clock frequencies in excess of two hundred Mhz. It is thus theoretically possible to generate a biphase waveform at a 100 Mhz data rate.

Special case situations may be accommodated by the present invention which can not be accommodated by biphase waveform generators now known in the art. Considering such a special case, reference is made to FIGS. 3 and 4 wherein it is assumed that an eight bit binary word contains a sync field and a data field. The sync field is to be low for 1.5 bit times and high for 1.5 bit times. The data field will be 5 bit times long with a bit time defined as 1.0 μ seconds. This special case is illustrated in FIG. 3.

Thus, bits 1, 2 and 3 which are in the sync field are applied to shift register 12, with which terminals F, G and H thereof being connected to ground and terminals C, D and E being connected through a resistor 31 to, for example, a +5 volt supply. Bit 4 which is now at a "zero" logic level is applied to terminal B as heretofore described with reference to FIG. 1, and applied through an inverter 20 to terminal A also as heretofore described. Bit 5 and 8 are now at "zero" logic levels while bits 6 and 7 are at "one" logic levels. Bits 5, 6, 7 and 8 are applied to terminals H, F, D and B as heretofore described and are applied through inverters 22, 24, 26 and 28 to terminals G, E, C and A also as heretofore described. The load word waveform, the shift clock waveform and the transmit enable waveform are as shown in FIGS. 4(a), 4(b), and 4(c) respectively, and which waveforms are similar to those shown in FIGS. 2(a), 2(b) and 2(c).

Figure 3:
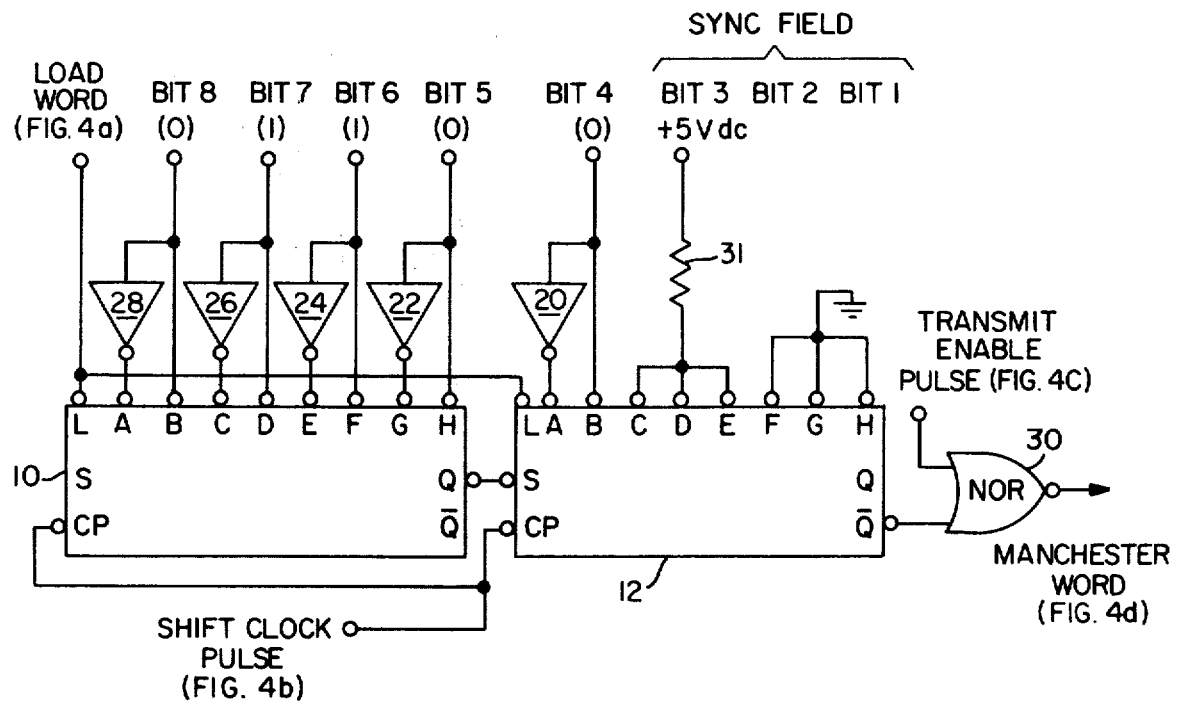
FIG. 3 is a schematic diagram of a biphase waveform generator according to the invention when certain of the data bits are predetermined.
Figure 4:
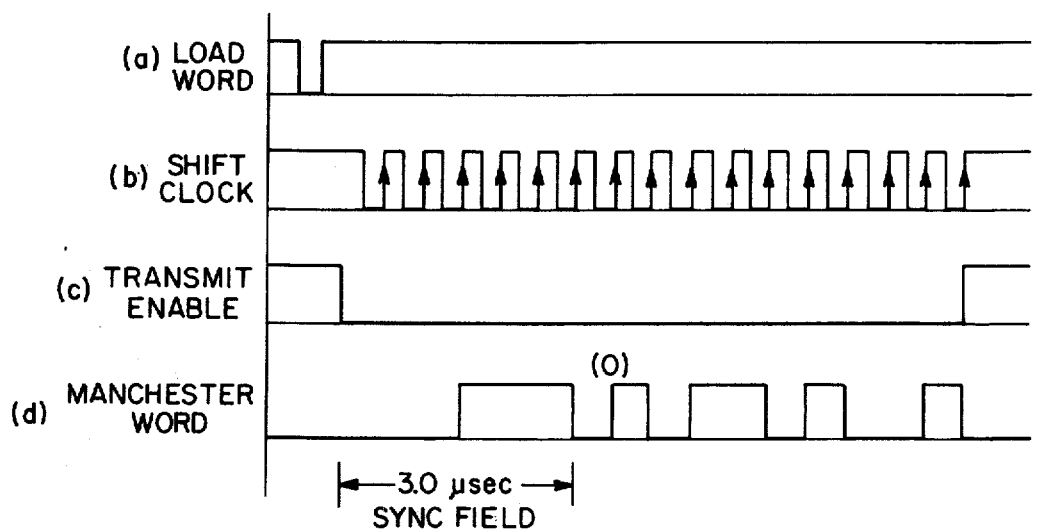
FIGS. 4(a), (b), (c) and (d) are waveforms commensurate with the schematic diagram of FIG. 3.

The special case as illustrated by FIGS. 3 and 4 bears no direct comparison with prior art apparatus unless a separate sync field generator operating at, for example, 333 Khz. is used. It would also be necessary to multiplex the sync and data fields to ensure their precise alignment. It is in an application such as that described with reference to FIGS. 3 and 4 that the device of the invention is universal in that it can handle departures from standard waveforms such as the special case described without requiring alteration in the basic configuration. Further, component conservation is achieved since not as many inverters are required as may be seen by comparing FIGS. 1 and 3.

Although the invention has been described with reference to a biphase waveform including eight bits it will be understood that shift registers 10 and 12 can be duplicated to accommodate words with more bits as long as the condition is satisfied that a serial register of length 2N where N is the number of bits to be transmitted is provided.

It will now be seen that the aforenoted objects of the invention have been satisfied. High frequency limitations which are common in the prior art devices have been overcome by use of a serial register of length 2N. Each data bit is loaded into a shift register both directly and into the next higher adjacent stage, inverted. Double clocking provides for generating an alternating logic level signal for each data bit, and the phases of these signals are combined to form the biphase wave as shown in FIGS. 2(d) and 4d). Since no compensation for propagation delay is required the performance of this equipment is limited only by the speed of the components employed. Further, where certain of the data bits are predetermined as in the sync field described with reference to FIG. 3, inverters associated with adjacent inputs may be eliminated as shown in the figure. The inputs may then be wired to ground or to a positive d.c. level as will now be understood.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for generating a biphase waveform from a plurality of data bits, comprising:
   a serial register of length 2N, where N is the number of data bits;
   means for applying the data bits to the register including a plurality of inverters and means for applying each of the data bits to the register directly and through a corresponding inverter;
   means for clocking the register at twice a predetermined output data rate, with the register providing an alternating logic level signal for each data bit; and
   means for combining the phases of the alternating signals for each data bit to provide the biphase waveform.

2. A method for generating a biphase waveform from a plurality of data bits, including the steps of:
   applying the data bits to a serial register of length 2N where N is the number of data bits;
   clocking the register at twice an output data rate for enabling the register to provide an alternating logic level signal for each data bit; and
   combining the phases of the alternating signals for each data bit for providing the biphase waveform including enveloping the alternating signals with an enabling signal.

3. Apparatus for generating a biphase waveform from a plurality of data bits, comprising:
   a serial register of length 2N, where N is the number of data bits;
   means for applying the data bits to the register;
   means for clocking the register at twice a predetermined output data rate, with the register providing an alternating logic level signal for each data bit; and
   means for combining the phases of the alternating signals for each data bit to provide the biphase waveform including a NOR gate connected to the register and responsive to the alternating logic level signals, and responsive to an enabling pulse for providing the biphase waveform.

4. Apparatus for generating a biphase waveform from a plurality of data bits, comprising:
 a serial register of length 2N, where N is the number of data bits, including at least a first register and a second register following the first register; means for applying the data bits to the serial register;
 means for clocking the serial register at twice a predetermined output data rate, with the register providing an alternating logic level signal for each data bit;
 means for combining the phases of the alternating signals for each data bit to provide the biphase waveform;
 each of the first and second registers having a load terminal, an input terminal, a clock terminal, data bit terminals, an output terminal and a complementary output terminal; and
 a load word is applied to the load terminals, the data bits are applied to the data bit terminals, the clocking means is connected to the clock terminals, the output terminal of the first register is connected to the input terminal of the second register, and the complementary output terminal of the second register is connected to the combining means.

5. Apparatus for generating a biphase waveform from a plurality of data bits, comprising:
 a serial register of length 2N, where N is the number of data bits;
 means for applying the data bits to the register;
 means for clocking the register at twice a predetermined output data rate, with the register providing an alternating logic level signal for each data bit;
 means for combining the phases of the alternating signals for each data bit to provide the biphase waveform;
 certain of the data bits being predetermined so as to define a sync field and the register having corresponding predetermined data bit terminals; and
 certain of the predetermined register data bit terminals being connected to ground while the other of said terminals are connected through a load register to a power supply.

6. A method for generating a biphase waveform from a plurality of data bits, including the steps of:
 applying the data bits to a serial register of length 2N where N is the number of data bits including applying the data bits directly to the register, inverting the bits, and applying the inverted bits to the register;
 clocking the register at twice an output data rate for enabling the register to provide an alternating logic level signal for each data bit; and
 combining the phases of the alternating signals for each data bit for providing the biphase waveform.

7. A method for generating a biphase waveform from a plurality of data bits, including the steps of:
 applying the data bits to a serial register of length 2N where N is the number of data bits including predetermining certain of the data bits, said predetermined bits defining a sync field, predetermining certain corresponding register data bit terminals, connecting certain of the predetermined data bit terminals to ground, and connecting the other of said data bit terminals through a register to a power supply;
 clocking the register at twice an output data rate for enabling the register to provide an alternating logic level signal for each data bit; and
 combining the phases of the alternating signals for each data bit for providing the biphase waveform.

* * * * *